United States Patent [19]

Balthaus et al.

[11] Patent Number: 5,061,119
[45] Date of Patent: Oct. 29, 1991

[54] METHOD AND APPARATUS FOR THE REMEDIATION OF CONTAMINATED SOILS

[75] Inventors: Hansgeorg Balthaus, Düsseldorf; Karl Hoffmann, Essen, both of Fed. Rep. of Germany

[73] Assignee: Philipp Holzmann Aktiengesellschaft, Frankfurt am Main, Fed. Rep. of Germany

[21] Appl. No.: 568,835

[22] Filed: Aug. 17, 1990

[51] Int. Cl.[5] .............................................. B09B 1/00
[52] U.S. Cl. ................................... 405/128; 210/747; 405/263
[58] Field of Search ............... 405/128, 129, 266, 269, 405/263; 210/747, 751, 752; 166/252, 270

[56] References Cited

U.S. PATENT DOCUMENTS

| | | | |
|---|---|---|---|
| 2,768,949 | 10/1956 | Hewey | 405/128 X |
| 3,841,102 | 10/1974 | Cinner et al. | 405/128 |
| 4,302,132 | 11/1981 | Ogawa et al. | 405/266 X |
| 4,456,400 | 6/1984 | Heide et al. | 405/266 X |
| 4,582,611 | 4/1991 | Wang | 210/747 |
| 4,624,606 | 11/1986 | Nakanishi et al. | 405/269 |
| 4,705,218 | 11/1987 | Daniels | 405/269 X |
| 4,786,212 | 11/1988 | Bauer et al. | 405/269 |
| 4,844,839 | 7/1989 | Manchak | 405/269 X |

FOREIGN PATENT DOCUMENTS

| | | |
|---|---|---|
| 3604168 | 8/1987 | Fed. Rep. of Germany . |
| 8804344 | 3/1988 | Fed. Rep. of Germany . |
| 3811714 | 10/1988 | Fed. Rep. of Germany . |
| 3739126 | 6/1989 | Fed. Rep. of Germany . |

OTHER PUBLICATIONS

M. Döppert, WLB Wasser, Luft und Boden of Mar. 1989, p. 58.

Primary Examiner—Dennis L. Taylor
Attorney, Agent, or Firm—Robert W. Becker & Associates

[57] ABSTRACT

A method for the remediation of contaminated soils, in which, without transport of the soil to the surface, a loosening of the soil structure is achieved by progressively injecting a liquid under high pressure into at least one cylindrically shaped soil body. Besides loosening the soil the liquid also serves as a carrier and transport medium for at least one effective substance, which decomposes and/or converts the respective contaminant on site. By this method, the effective substances are uniformly distributed in the soil treatment zones and reach the contaminants even in heterogeneous soil structures.

10 Claims, 2 Drawing Sheets

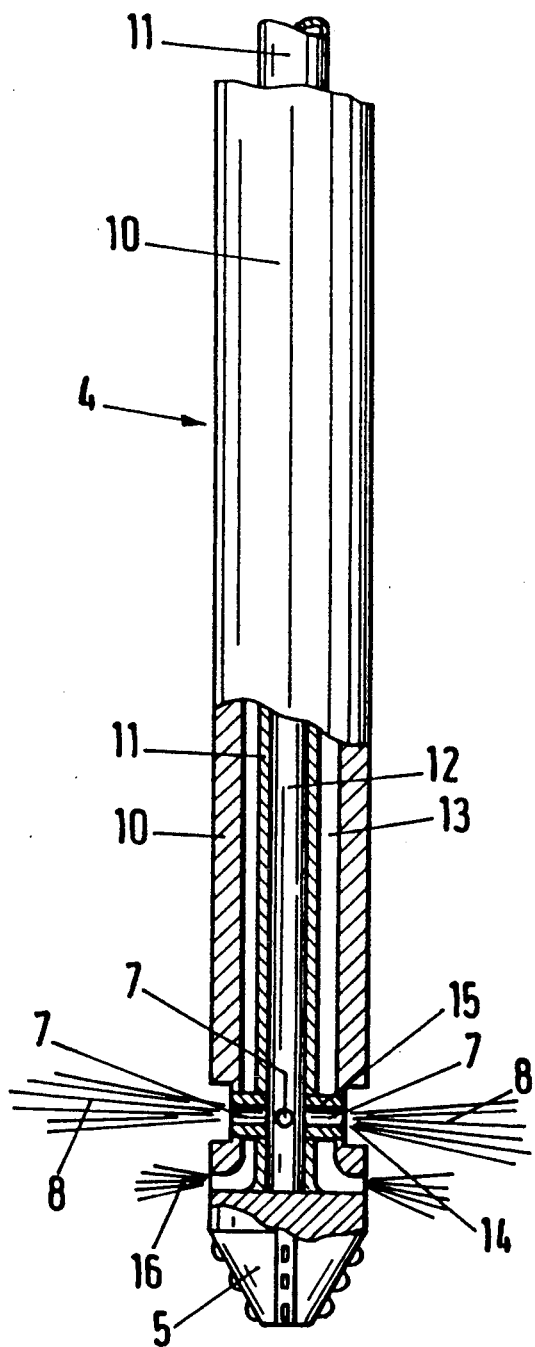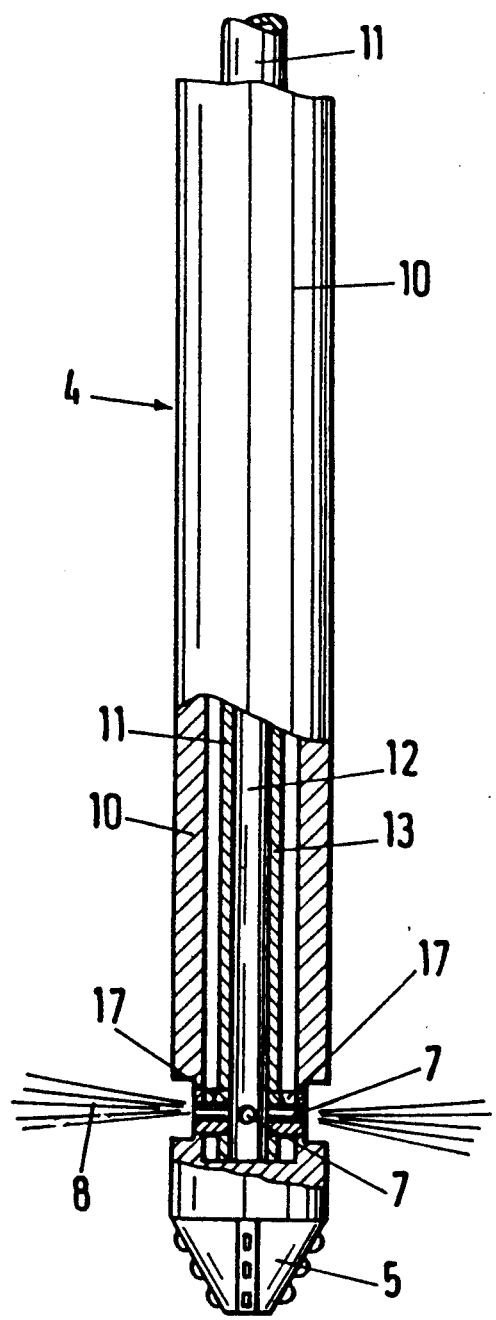

ns inside a cylindrical core are already well delivered. The core itself is nearly impermeable as long as the high pressure is applied. Concentric around this core are the zones of compressed

METHOD AND APPARATUS FOR THE REMEDIATION OF CONTAMINATED SOILS

BACKGROUND OF THE INVENTION

The present invention relates to a method for the remediation of contaminated soils of anthropogenic or geologic origin in which, without transport of the soil to the soil surface, a loosening of the soil structure is achieved by injecting a liquid under high pressure progressively into at least one cylindrically shaped soil body.

Furthermore, the present invention relates to an apparatus for a soil remediation process consisting of a drill pipe (drill poles) with a drill head and an inlet conduit. Above the drill head there is at least one outlet nozzle for the liquid being ejected under high pressure.

Methods for the remediation of contaminated soils have been known, in which the contaminants are washed off the soil particles by a jet of water or a remediation medium injected into the soil under high pressure. The resulting mixture of remediation medium, contaminants and soil particles is then transported to the soil surface where the remediation medium or the water are recycled in a treatment plant. The separated contaminants are then stored in a suitable landfill, if necessary. With these known methods it is inevitable that soil particles are transported to the soil surface together with the contaminants carrying remediation medium, therefore the particles removed from the soil, e.g., silt, sand, have to be returned to the soil after complete decontamination in the treatment plant or substituted by suitable additives.

Furthermore, on-site soil remediation methods (in situ) are known, which employ microbiological decomposition of certain contaminant groups by using a directed introduction of nutrients into the soil from the soil surface or a specially designed introduction well to thereby stimulate a higher metabolic rate in the soil microorganisms naturally present. In one embodiment of this known method, in addition to the nutrients, the microorganisms chosen for the treatment are also introduced into the soil.

The structure of a naturally formed soil is heterogeneous and anisotropic. The transition between different soil layers is usually abrupt and intermittent. Differences of the soil layers in permeability, in anisotropic properties as well as in affinity and adsorption tendencies towards a contaminant or its aqueous solution or suspension often impede the realization of microbiological insitu processes or result in failure. Usually soil layers with the lowest permeability are especially contaminated. When soil layers of different permeability are present, introduced substances and microorganisms in aqueous solution tend to move and remain in soil layers that are highly permeable and in which contamination is usually low. Nearly impermeable soil layers may limit the success of microbiological in-situ processes or completely prevent contaminants and microorganisms from coming into contact.

It is therefore an object of the present invention to provide a method for the remediation of contaminated soils, in which the removal or conversion of the contaminants is not carried out at the soil surface but in the soil (in-situ) without providing an encapsulation from the surrounding soil. Furthermore, a suitable apparatus for the realization of the method is provided.

BRIEF DESCRIPTION OF THE DRAWINGS

This object, and other objects and advantages of the present invention, will appear more clearly from the following specification in conjunction with the accompanying drawings, in which:

FIG. 3 is a view of a drill pipe, partially broken away, as a first preferred embodiment; and FIG. 4 is a view of a drill pipe, partially broken away, as another preferred embodiment.

SUMMARY OF THE INVENTION

Figure 1:
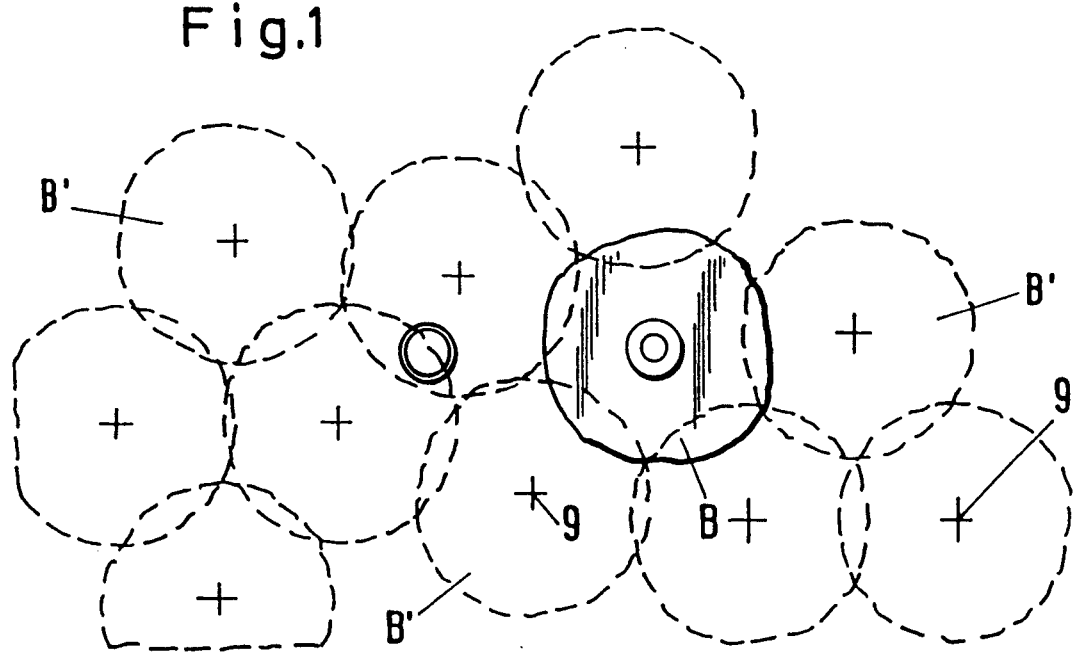
FIG. 1 is a schematic representation in top vie w of a soil remediation process in progress with a drill pipe vertically driven into the soil and a water reclamation measure represented by a well shaft.

The method of the present invention is characterized primarily in that at least one effective substance, which decomposes and/or converts the respective contaminant on site, is introduced into the loosened soil structure with the liquid.

By loosening the soil structure the homogeneity and permeability of the soil are increased, thereby conditioning the soil for a directed and efficient introduction of the effective substance. The effective substance is introduced into the homogenized soil structure by using liquid as a carrier and transport medium, thereby insuring a homogeneous distribution of the effective substance in the soil.

The effective substance is defined herein as a substance which causes a biological, chemical or physical removal or conversion of the contaminant or a combination of the above. In particular, the effective substances may be decomposition effecting substances, e.g., microorganisms, nutrients, and additives, stimulating the growth of present and/or introduced microorganisms, and chemicals causing chemical decomposition or conversion of the contaminants. Moreover, it is possible to add solvents or substances to increase the flow permeability of the soil. The introduction of gases, air included, into the soil results in contaminant mobilization. Effective substances based on physical action include solidifying agents which cause contaminant fixation on the respective soil particles. In order to neutralize the contaminated soil particles, it is also possible to inject effective substances into the soil which form an encapsulating coating on the respective soil particle.

The method according to the present invention promotes the introduction of the aforementioned effective substances by homogenizing the contaminated soil through the liquid jet injected into the soil under high pressure. This practice insures an isotropic and continuous distribution of the effective substance, starting chemical, physical or biological processes which lead to the decomposition of the contaminants or their conversion into harmless products.

The method of the present invention differs from the prior art in-situ process for soil remediation in that no soil particles and contaminants have to be transported to the soil surface so that no waste is produced.

The advantage over prior art in-situ methods, employing introduction of nutrients and/or microorganisms, lies in avoiding the slow and often ineffective flow process by replacing it by a highly effective transport mechanism for all necessary substances. This transport mechanism causes the homogenization and loosening of the soil structure at the same time.

In a preferred embodiment of the present invention the loosening of the soil structure and simultaneous introduction of at least one effective substance to the contaminants in the loosened soil are repeated consecutively. This enables the introduction of microorganisms and nutrients consecutively into the already loosened soil. Another variation of this practice is to first inject a solvent into the already loosened soil and then add the effective substance to the already dissolved contaminants.

Another preferred embodiment of the present invention is the installation and operation of a water reclamation measure to insure a flow gradient. This water reclamation measure serves to remove the liquid used to loosen the soil structure and transport the effective substance. It may consist of a well shaft driven into the soil which maintains a continuous funnel-shaped flow gradient in the soil. The liquid serving as a carrier and transport medium, e.g., water, collects in the well shaft due to the underground flow field and is transported back to the soil surface.

It may be advantageous to recycle the reclaimed liquid into the injection cycle, if necessary, after addition of effective substance. Since the contaminants remain in the soil, i t is not necessary to clean the liquid removed from the water reclamation measure because it only contains unused effective substance.

The present invention provides an apparatus in which a second inlet conduit is connected to at least one outlet port for the respective effective substance, which decomposes and/or converts the contaminant.

In a preferred embodiment of the apparatus the outlet port opens above or below the outlet nozzle into the soil treatment zone. This arrangement allows the effective substance delivered via the outlet port to collect close to the outlet port. It is then distributed by the liquid ejected under high pressure while the soil is simultaneously loosened.

In another preferred embodiment the outlet port opens into the outlet nozzle, so that the effective substance is carried by the liquid ejected under high pressure in a similar manner as a water-jet pump and distributed evenly in the soil.

DESCRIPTION OF PREFERRED EMBODIMENTS

The present invention will now be described in detail with the aid of several specific embodiments utilizing FIGS. 1-4.

Figure 2:
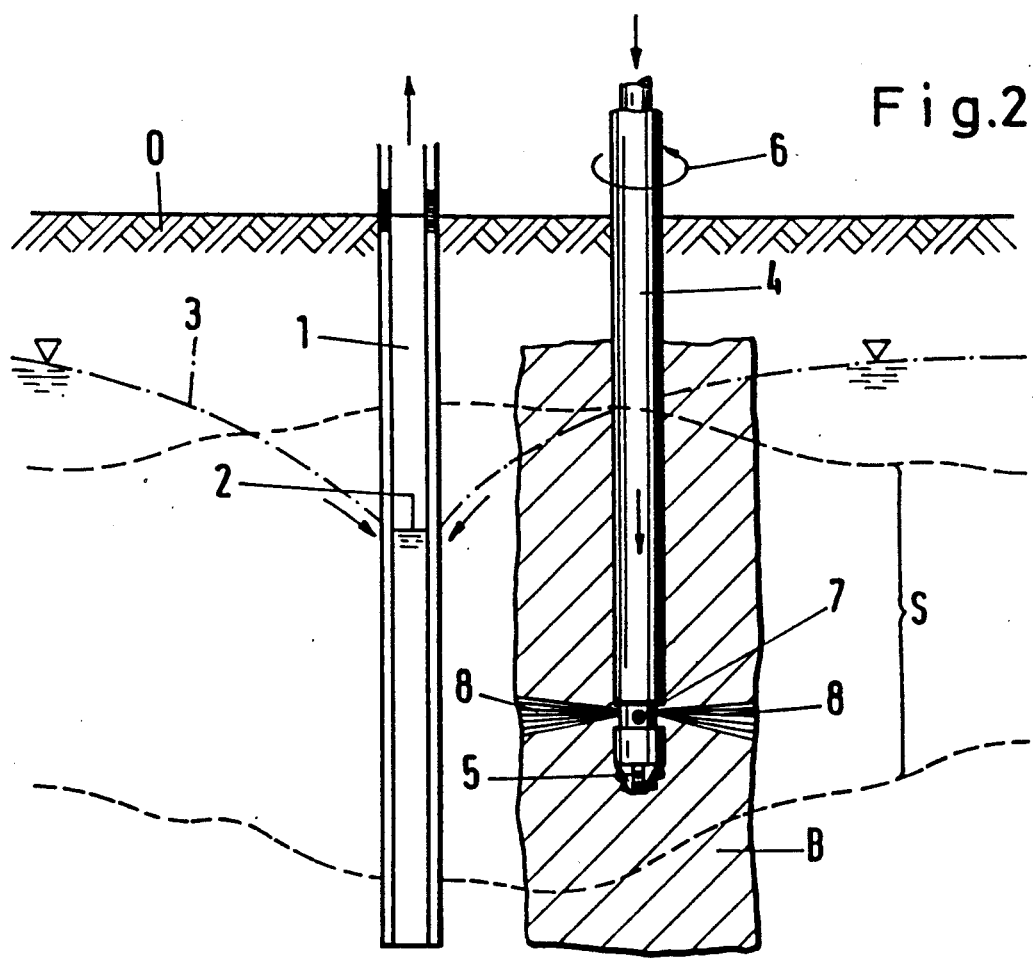
FIG. 2 is a vertical cross-sectional view of the soil formation o FIG. 1 taken along the plane of the drill pipe and the well shaft.

FIG. 2 shows a vertical cross-sectional view of a soil formation in which the contaminated soil area S below the soil surface O is represented by a broken line. A well shaft is driven into the soil, the water level 2 of which is kept below the water level of the soil, so that a flow gradient 3 (represented by a dotted line in FIG. 2) shaped like a funnel around the well shaft 1 is created.

A drill pipe 4 with a drill head 5 attached to the tip is driven into the soil under simultaneous rotation 6. When a section of the drill pipe 4, located closely above the drill head and equipped with outlet nozzles 7, reaches the contaminated soil area S, a liquid is injected into the soil through the drill pipe 4 and the outlet nozzles 7 by a high pressure pump. The liquid jet 8, preferably radially ejected from the drill pipe 4, covers a cylindrical soil treatment zone B due to the rotation 6 and the simultaneous lowering of the drill pipe 4. The soil structure of the cylindrical soil treatment zone B is loosened and homogenized by the cutting and turbulent action of the liquid jet 8. The diameter of the cylindrical soil treatment zone is determined by the effective range of the liquid jet 8.

An effective substance is added to the liquid, whereby the liquid is under high pressure and serves as a carrier medium to transport and distribute the effective substance in the soil body B homogeneously.

In this manner the effective substance or the agent reaches the contaminants adhered to the soil particles and reacts with the contaminants by chemically, physically or biologically decomposing or converting them. The liquid which serves solely as a loosening, carrier and transport medium is affected by the artificially maintained flow gradient 3 and is continuously transported back to the surface O via the well shaft. The removed liquid may still contain parts of the agents which have not been in effective contact with the contaminants. The liquid which has been transported back to the surface O is enriched with more effective substance in a suitable apparatus and is recycled through the drill pipe into the contaminated soil treatment zone B.

FIG. 1 represents the progressive performance of the afore-described method whereby the drill pipe 4 is consecutively driven into the soil at different locations 9 resulting in a soil remediation method covering large areas due to the numerous soil treatment zones B'. It is, of course, possible to work with various drill pipes at the same time to speed up the remediation process. In soil areas with difficult access, e.g. under buildings, the effective substance may be distributed in the soil by a transversely driven drill pipe. After the soil area has been treated accordingly, the treatment may be repeated partially or completely with the same or with other effective substances.

Besides the well shaft 1 the use of drainage measures, e.g. a ditch dug around the contaminated soil area, may be used as a water reclamation measure.

The drill pipe 4, shown in detail in FIG. 3, is equipped with an outer casing 10 and a concentric inner casing 11. The inner casing 11 encloses a cylindrical inlet conduit 12. Between the inner casing 11 and the outer casing 10 there is another ring-shaped inlet conduit 13.

In the cross-sectional view, close above the drill head 5, the drill pipe 4 exhibits a narrowed section 14 into which the outlet nozzles 7 open. In the embodiment according to FIG. 3 the outlet nozzles 7 are formed in a radially arranged jacket 15 the boring of which opens into the central inlet conduit 12.

Below the outlet nozzles 7 there are outlet ports 16 which are radially arranged around the drill pipe 4 and connected to the additional ring-shaped inlet conduit 13.

When the drill pipe 4, represented in FIG. 3, is used for the described method, the effective substance or the agent is transported through the additional ring-shaped inlet conduit 13 to the outlet ports 16 and from there introduced into the soil treatment zone. Due to the constantly rotating drive of the drill pipe 4 the effective substance, injected into the soil accordingly, reaches the range of the liquid jet 8 ejected under high pressure from the outlet nozzles 7, whereby effective substance parts, already present in the soil, are carried away and distributed evenly in the soil treatment zone by the liquid ejected under high pressure, while, at the same time, loosening the soil.

In the drill pipe 4 according to FIG. 4 the effective substance, fed via the additional ring-shaped inlet conduit 13, reaches the liquid transported under high pressure via the outlet ports 17, which function as mixing nozzles, before the opening of the outlet nozzles 7, so that a strong turbulence and mixing of the effective substance within the liquid, serving as a carrier medium, occurs, similar to the mechanism of a water-jet pump.

The present invention is, of course, in no way restricted to the specific disclosure of the specification and drawings, but also encompasses any modifications within the scope of the appended claims.

What we claim is:

1. A method for the remediation of contaminated soils, without transport of the soil to the surface, comprising the steps of:
    introducing at least one drill pipe under constant rotation into said contaminated soil;
    upon reaching a level of contaminated soil, loosening the soil structure by progressively injecting a liquid under high pressure via at least one outlet nozzle of said rotating drill pipes radially into a respective soil treatment zone, that coaxially surrounds said drill pipe and is of an essentially cylindrical shape having a diameter according to an effective range of said injected liquid; and
    introducing, together with said liquid, at least one effective substance, which remediates the respective contaminant on site, into the loosened soil structure.

2. A method according to claim 1, which includes the step of consecutively repeating the loosening of the soil structure and the simultaneous introduction of at least one effective substance to the contaminants present in the loosened soil.

3. A method according to claim 1 which includes the step of generating a flow gradient for removal of said liquid from the soil, whiCh liquid serves as a loosening agent for the soil structure a transporting medium for the effective substance.

4. A method according to claim 3, which includes the step of recycling the removed liquid into the injection cycle.

5. An apparatus for the remediation of contaminated soils, in which, without transport of the soil to the surface, a loosening of the soil structure is achieved by progressively injecting a liquid under high pressure into at least one essentially cylindrically shaped soil treatment zone, said apparatus being in the form of a drill pipe and comprising:
    a drill head disposed at one end of said drill pipe and;
    an outer casing and a concentric inner casing, whereby between said inner casing and said outer casing there is provided a ring-shaped inlet conduit for an effective substance, with said concentric inner casing enclosing a cylindrical inlet conduit for said liquid injected under high pressure; and with said cylindrical inlet conduit in the vicinity of said drill head, having at least one outlet nozzle for said liquid and with said ring-shaped inlet conduit opening into at least one outlet port for said effective substance.

6. An apparatus according to claim 5, in which the outlet port opens above said outlet nozzle into the soil treatment core.

7. An apparatus according to claim 5, in which the outlet port opens below said outlet nozzle into the soil treatment core.

8. An apparatus according to claim 5, in which said outlet port opens into said outlet nozzle.

9. A method according to claim 1, further comprising the step of:
    introducing as said effective substance a chemically remediating substance.

10. A method according to claim 1, further comprising the step of:
    introducing as said effective substance a biologically remediating substance.

* * * * *

UNITED STATES PATENT AND TRADEMARK OFFICE
CERTIFICATE OF CORRECTION

PATENT NO. : 5,061,119
DATED : Oct. 29, 1991
INVENTOR(S) : Hansgeorg Balthaus et al It is certified that error appears in the above-identified patent and that said Letters Patent is hereby corrected as shown below:

Title page, insert after item [22]

[30] Foreign Application Priority Data

Aug. 19, 1989 [DE]..... Fed. Rep. of Germany...3927418

Signed and Sealed this

Ninth Day of March, 1993

Attest:

Attesting Officer

STEPHEN G. KUNIN

Acting Commissioner of Patents and Trademarks